United States Patent
Takahashi et al.

(10) Patent No.: US 7,368,493 B2
(45) Date of Patent: May 6, 2008

(54) CARBODIIMIDE COMPOSITION WITH SUPPRESSED YELLOWING, A STABILIZER AGAINST HYDROLYSIS AND A THERMOPLASTIC RESIN COMPOSITION

(75) Inventors: Ikuo Takahashi, Chiba (JP); Hirotaka Iida, Chiba (JP); Norimasa Nakamura, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 461 days.

(21) Appl. No.: 10/900,282

(22) Filed: Jul. 28, 2004

(65) Prior Publication Data
US 2005/0032947 A1 Feb. 10, 2005

(30) Foreign Application Priority Data
Aug. 7, 2003 (JP) .............................. 2003-288472

(51) Int. Cl.
*C08K 5/29* (2006.01)
(52) U.S. Cl. ...................... 524/195; 524/128; 252/399; 252/400.2; 252/400.24
(58) Field of Classification Search ................ 524/128, 524/195; 252/399, 400.2, 400.24
See application file for complete search history.

(56) References Cited

U.S. PATENT DOCUMENTS

| | | | |
|---|---|---|---|
| 2,941,956 A | | 6/1960 | Bergstrom |
| 5,248,713 A | * | 9/1993 | Lunk et al. ................. 524/120 |
| 5,889,096 A | | 3/1999 | Imashiro et al. ............ 524/195 |
| 6,451,890 B1 | * | 9/2002 | Imashiro et al. ............ 524/195 |
| 6,846,860 B2 | * | 1/2005 | Takahashi et al. .......... 524/128 |

FOREIGN PATENT DOCUMENTS

| | | |
|---|---|---|
| DE | 2210839 | 9/1973 |
| EP | 1 354 917 A1 | 10/2003 |
| JP | 47-33279 | 8/1972 |
| JP | 9-296097 | 11/1997 |
| JP | 11-80522 | 3/1999 |
| JP | 3122485 | 10/2000 |
| JP | 2001-342331 | 12/2001 |

OTHER PUBLICATIONS

Campbell and Smeltz; *High Polymers Containing the Carbodiimide Repeat Unit*, J. Org. Chem., Aug. 1963; pp. 2069-2075.
Chemical Reviews, 1981, vol. 81, No. 4; pp. 619-621.

* cited by examiner

*Primary Examiner*—Edward J. Cain
(74) *Attorney, Agent, or Firm*—Westerman, Hattori, Daniels & Adrian, LLP.

(57) ABSTRACT

A carbodiimide composition having an improved heat resistance which meets conventional requirements for a carbodiimide compound to be compounded in an ester-group-containing resin or a biodegradable plastic, and exhibiting no coloring problems due to yellowing, and having a superior stabilizing effect agains hydrolysis. The carbodiimide composition comprises a carbodiimide compound (A) and an antioxidant (B), having a 5% weight loss temperature not lower than 250° C. as determined by a thermogravimetric (TG) method, wherein an antioxidant (B) is dispersed and present in the composition by admixing during synthesis of a carbodiimide compound (A), a stabilizer against hydrolysis mainly comprising the carbodiimide composition and a thermoplastic resin composition containing the same.

10 Claims, No Drawings

CARBODIIMIDE COMPOSITION WITH SUPPRESSED YELLOWING, A STABILIZER AGAINST HYDROLYSIS AND A THERMOPLASTIC RESIN COMPOSITION

BACKGROUND OF THE INVENTION

1. Field of the Invention

The present invention relates to a carbodiimide composition with suppressed yellowing, a stabilizer against hydrolysis mainly comprising the carbodiimide composition and a thermoplastic resin composition containing the same. More specifically, the present invention relates to a carbodiimide composition comprising a carbodiimide compound and an antioxidant, having a 5% weight loss temperature not lower than 250° C. as determined by a thermogravimetric (TG) method, a stabilizer against hydrolysis mainly comprising the carbodiimide composition and a thermoplastic resin composition containing the same.

2. Description of the Prior Art

A carbodiimide compound has a carbodiimide group represented by [—N=C=N—] in a molecule and characteristics such as reactivity with an active hydrogen (for example, hydrogen in carboxylic acids, amines, alcohols and thiols), good adhesion, superior heat resistance and ability to be processed into various forms (such as varnish, powder and film), and is utilized in a variety of applications including crosslinking agents and additives, adhesives, resin modifiers, heat insulating materials, sound absorbing materials and gaskets.

A carbodiimide compound has, however, the problem that the compound itself has is a high yellow index, which means when it is added to plastic materials, it causes the plastic materials to turn yellow or show yellowing by light or heat with passage of time.

In addition, a carbodiimide compound is widely used as a stabilizer against hydrolysis for an ester-group-containing resin or a biodegradable plastic. However, a compound with low molecular weight such as a monocarbodiimide also has problems such as causing an environmental pollution by generating a component having an offensive odor or losing the addition effect thereof by vaporizing, because of a tendency for easy thermal decomposition during processing.

Polycarbodiimide has been used to solve these problems, but use of this compound is difficult for an application where hue is seriously considered (for example, an application to a fiber for clothing) due to the yellowing problem during processing.

The above-described ester-group-containing resins include, for example, a polyethylene terephthalate resin, a polybutylene terephthalate resin, a polyester polyurethane resin, an unsaturated polyester resin, a maleic resin, a alkyd resin, a polycarbonate resin, a polyester carbonate resin, an aliphatic polyester resin, polyether esters, polyesteramides and polycaprolactones.

Further, biodegradable plastics can be roughly classified to aliphatic polyesters having a polyester group in their molecular chains (including those produced by microorganisms), natural polymers such as cellulose, polysaccharides produced by microorganisms, polyvinyl alcohol (PVA) and polyethers such as polyethylene glycol (PEG).

Among them, polylactic acid of an aliphatic polyester as a plastic material derived from plants, and with there being increasing interest on global environment problems such as $CO_2$ reduction, has been extensively studied in fields such as automotive parts, housings for home electric appliances and clothing.

However, the above-described resins having an ester group (ester-group-containing resins) and biodegradable plastics have poor stability against hydrolysis. In particular, biodegradable plastics including aliphatic polyesters have significantly poor stability, which has made it difficult to use these materials in applications with the same levels of functions (such as strength, water resistance, moldability and heat resistance) as those required of conventional plastics.

From these circumstances, several proposals relating to improvement of stability against hydrolysis of ester-group-containing resins or biodegradable plastics have been made. For example, proposals disclosed include one directed to a method for controlling a biodegradation rate of a biodegradable plastic (see, for example, JP-A-11-80522), or another one directed to a method for stabilizing against hydrolysis of an ester-group-containing resin (see, for example, JP-A-296097 and JP No. 3,122,485).

In spite of these proposals, the above problems of a carbodiimide compound have not been sufficiently solved in applications where hue is seriously considered, such as fibers, films and sheets, because of the yellowing of a carbodiimide compound when utilized as a stabilizer against hydrolysis.

SUMMARY OF THE INVENTION

Namely, an object of the present invention is to provide a carbodiimide composition having improved heat resistance meeting the conventional requirement for a carbodiimide compound to be compounded in an ester-group-containing resin or a biodegradable plastic, exhibiting no coloring problems due to yellowing, and having a superior stabilizing effect against hydrolysis; a stabilizer against hydrolysis mainly comprising the carbodiimide composition; and, a thermoplastic resin composition containing the same.

The present inventors have found, after comprehensive study to solve the problems of the prior art, that yellowing can be suppressed and stability against hydrolysis can be enhanced in an ester-group-containing resin and a biodegradable plastic composition or a thermoplastic resin composition, when these resin compositions are obtained by preparing a carbodiimide composition, as a mixed dispersion of a carbodiimide compound obtained and an antioxidant, having a 5% weight loss temperature not lower than 250° C. A high degree of whiteness (YI is not higher than 10), occurs by adding the antioxidant during synthesis of the carbodiimide compound, then compounding the carbodiimide composition into an ester-group-containing resin or a biodegradable plastic, in particular, an aliphatic polyester resin, in a specific amount to these resins. The present invention has been completed based on these findings.

Namely, the first aspect of the present invention is to provide a carbodiimide composition comprising a carbodiimide compound (A) and an antioxidant (B), a 5% weight loss temperature not lower than 250° C. as determined by a thermogravimetric (TG) method, wherein an antioxidant (B) is dispersed and present in the composition by admixing during synthesis of the carbodiimide compound (A).

Further, the second aspect of the present invention is to provide a carbodiimide composition according to the first aspect, wherein an antioxidant (B) is dispersed and present in the composition by admixing in raw materials of a carbodiimide compound (A).

Further, the third aspect of the present invention is to provide a carbodiimide composition according to the first aspect, wherein the amount of an antioxidant (B) is 0.01 to 20 parts by weight to 100 parts by weight of the carbodiimide compound (A).

Further, the forth aspect of the present invention is to provide a carbodiimide composition according to the first aspect, wherein a carbodiimide compound (A) is an aliphatic polycarbodiimide compound having a degree of polymerization of not lower than 5.

Further, the fifth aspect of the present invention is to provide a carbodiimide composition according to the first aspect, wherein an antioxidant (B) is any one of a phosphorus antioxidant as it is or a mixture of a phosphorus antioxidant and a hindered phenol antioxidant.

Further, the sixth aspect of the present invention is to provide a carbodiimide composition according to the fifth aspect, wherein the phosphorus antioxidant has a pentaerythritol structure.

Further, the seventh aspect of the present invention is to provide a carbodiimide composition according to the first aspect, wherein the yellow index (YI) is not higher than 10.

Further, the eighth aspect of the present invention is to provide a stabilizer against hydrolysis for an ester-group-containing resin or a biodegradable plastic, characterized by mainly comprising a carbodiimide composition according to any one of the first to the seventh aspects.

Further, the ninth aspect of the present invention is to provide a thermoplastic resin composition having superior stability against hydrolysis, wherein the stabilizer against hydrolysis according to the eighth aspect is compounded in at least one kind of an easily hydrolysable resin (C) selected from an ester-group-containing resin and a biodegradable plastic.

Further, the tenth aspect of the present invention is to provide a thermoplastic resin composition according to the ninth aspect, wherein an easily hydrolysable resin (C) is an aliphatic polyester.

As described hereinabove, the present invention relates to a carbodiimide composition comprising a carbodiimide compound (A) and an antioxidant (B), having a 5% weight loss temperature not lower than 250° C. as determined by a thermogravimetric (TG) method, wherein an antioxidant (B) is dispersed and present in a composition by admixing during synthesis of the carbodiimide compound, and involves the followings as preferable embodiments thereof.

(1) A carbodiimide composition according to the first aspect, wherein a carbodiimide compound (A) is any one of aliphatic polycarbodiimide compounds having an isocyanate terminal group or a terminal group capped with a compound having an OH group.

(2) A carbodiimide composition according to the fifth aspect, wherein a hindered phenol antioxidant is pentaerythritol tetrakis [3-(3,5-di-tert-butyl-4-hydroxyphenyl)propionate].

(3) A carbodiimide composition according to the sixth aspect, wherein a phosphorus antioxidant further has an aromatic hydrocarbon group having a t-butyl group, in addition to pentaerythritol structure.

(4) A carbodiimide composition according to the sixth aspect or the above third embodiment, wherein a phosphorus antioxidant is bis(2,4-di-t-butylphenyl)pentaerythritol diphosphite or bis (2,6-di-t-butyl-4-methylphenyl)pentaerythritol diphosphite.

(5) A thermoplastic resin composition according to the ninth aspect, wherein a stabilizer against hydrolysis is contained in an amount of 0.01 to 5 parts by weight to 100 parts by weight of an easily hydrolysable resin (C).

(6) Plastic molded parts using a thermoplastic resin composition according to the ninth or the tenth aspects.

(7) Plastic molded parts according to the above sixth aspect, wherein the form of the molded parts is any one of foamed body, molded parts, extruded parts, blow molded parts, thermoformed parts, fibers, nonwoven fabrics, films or sheet-like parts.

A carbodiimide composition of the present invention can exhibit such effects as to reduce yellow index of a carbodiimide compound itself without impairing superior characteristics possessed by a conventional carbodiimide compound such as reactivity with an active hydrogen (such as in carboxylic acids, amines, alcohols and thiols), good adhesion, superior heat resistance and ability to be processed into various forms (such as varnish, powder and film), along with improved stability against hydrolysis, and still further reducing the yellow index of plastics added with this carbodiimide composition.

Further, a stabilizer against hydrolysis mainly comprising a carbodiimide composition of the present invention has the effect of exhibiting superior stability against hydrolysis when compounded in a resin having an ester bond (an ester group) or a biodegradable plastic.

BEST MODE FOR CARRYING OUT THE INVENTION

Hereinbelow, a carbodiimide composition of the present invention will be described in detail item by item.

A carbodiimide composition of the present invention is one mainly comprising a carbodiimide compound (A) and an antioxidant (B), having a 5% weight loss temperature not lower than 250° C. as determined by a thermogravimetric (TG) method, wherein an antioxidant (B) is dispersed and present in a composition by admixing during synthesis of a carbodiimide compound (A).

Further, a stabilizer against hydrolysis of the present invention is characterized by mainly comprising the above-described carbodiimide composition, and is used as an additive for an ester-group-containing resin or a biodegradable plastic.

Still further, a thermoplastic resin composition of the present invention, having superior stability against hydrolysis is characterized in that the above-described stabilizer against hydrolysis is compounded in at least one kind of an easily hydrolysable resin (C) selected from an ester-group-containing resin or a biodegradable plastic.

1. A Carbodiimide Compound (A)

As a carbodiimide compound having at least one carbodiimide group in a molecule (including a polycarbodiimide compound) used in the present invention, those synthesized by a commonly known method, except that an antioxidant is admixed, can be used. For example, a carbodiimide compound can be synthesized by subjecting various kinds of polyisocyanates to a decarboxylation condensation reaction with an organophosphorus compound or an organometal compound as a catalyst, at a temperature of not lower than about 70° C., in an inert solvent or without using any solvent.

As a polycarbodiimide compound included in the above-described carbodiimide compounds, those produced by various methods can be used. Basically, polycarbodiimide compounds can be used, which are manufactured by conventional methods for manufacturing polycarbodiimide [for example, U.S. Pat. No. 2,941,956, JP-B-47-33279, J.

Org. Chem., 28, 2,069-2,075 (1963) and Chemical Review 1981, Vol. 81, No. 4, p 619-621].

Organic diisocyanate utilizable as a raw material for manufacturing a polycarbodiimide compound include, for example, an aromatic diisocyanate, an aliphatic diisocyanate, an alicyclic diisocyanate and a mixture thereof. More specifically, the organic diisocyanate includes such as 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenylisocyanate and 1,3,5-triisopropylbenzene-2,4-diisocyanate.

In addition, in the case of the above-described polycarbodiimide compound, the degree of polymerization can be adequately controlled by quenching a polymerization reaction in the midst of the reaction by cooling or the like. In this case, the terminal group becomes isocyanate. Another method for adequately controlling the degree of polymerization is to cap all or a part of the remaining terminal isocyanate groups using a reactive compound with terminal isocyanate groups of a polycarbodiimide compound such as a monoisocyanate. Control of the degree of polymerization is preferable from the viewpoint of quality improvement, due to providing improved compatibility to a polymer or enhanced storage stability.

A monoisocyanate utilizable to control the degree of polymerization by capping terminal groups of a polycarbodiimide compound includes, for example, phenyl isocyanate, tolylisocyanate, dimethylphenyl isocyanate, cyclohexyl isocyanate, butyl isocyanate and naphthyl isocyanate.

Further, an end-capping agent to control the degree of polymerization by capping terminal groups of a polycarbodiimide compound is not limited to the above-described monoisocyanate, but also includes active hydrogen compounds reactive with isocyanate, such as (i) aliphatic, aromatic or alicyclic compounds having an —OH group, such as methanol, ethanol, phenol, cyclohexanol, N-methylethanolamine, polyethylene glycol monomethyl ether and polypropylene glycol monomethyl ether; (ii) diethylamine and dicyclohexylamine having an =NH group; (iii) butylamine and cyclohexylamine having an —NH$_2$ group; (iv) succinic acid, benzoic acid and cyclohexanoic acid having a —COOH group; (v) ethylmercaptane, allylmercaptane and thiophenol having a —SH group; (vi) compounds having an epoxy group; (vii) acetic anhydride, methyltetrahydrophthalic anhydride and methylhexahydrophthalic anhydride. Among these compounds, those having an —OH group are desirable as less yellowing structures.

The above-described decarboxylation condensation reaction of an organic diisocyanate is carried out under the presence of a suitable carbodiimidation catalyst, and preferable carbodiimidation catalysts to be used are organophosphorus compounds, organometal compounds (compounds represented by the general formula of M-(OR)$_4$ [wherein M represents titanium (Ti), sodium (Na), potassium (K), vanadium (V), tungsten (W), hafnium (Hf), zirconium (Zr), lead (Pb), manganese (Mn), nickel (Ni), calcium (Ca), barium (Ba) and the like; and R represents an alkyl group or an aryl group having 1 to 20 carbon atoms]). Among them, in particular, phosphorene oxides in the organophosphorus compounds and alkoxides of titanium, hafnium and zirconium in the organometal compounds are preferable from the viewpoint of activity.

The above-described phosphorene oxides include specifically, 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide and double bond isomers thereof. Among them, 3-methyl-1-phenyl-2-phosphorene-1-oxide is particularly preferable because of easiness in industrial availability.

According to the present invention, when a carbodiimide composition is compounded in a resin having an ester group (an ester-group-containing resin) or a biodegradable plastic, the carbodiimide compound (A) plays a role to control hydrolysis, in the initial stage after the addition, by reacting with a hydroxyl group and a carboxyl group remaining in a resin having an ester group which is thought to facilitate the hydrolysis, or a biodegradable plastic resin. After that, the carbodiimide composition plays a role by bonding to the ester linkages cleaved by the hydrolysis reaction or bonds the biodegradable plastic to recombine them.

A carbodiimide compound (A) for this purpose includes, for example, 4,4'-dicyclohexylmethanecarbodiimide (degree of polymerization=2 to 20), tetramethylxylylenecarbodiimide (degree of polymerization=2 to 20), N,N-dimethylphenylcarbodiimide (degree of polymerization=2 to 20) and N,N'-di-2,6-diisopropylphenylcarbodiimide (degree of polymerization=2 to 20). The carbodiimide compound (A) is not specifically limited as long as it has not less than one carbodiimide group in a molecule having such function, but preferably an aliphatic polycarbodiimide compound from the viewpoints of hue, safety and stability, and the degree of polymerization thereof is preferably not lower than 5 from the viewpoint of heat resistance which requires a 5% weight loss temperature not lower than 250° C. of TG.

Further, an aliphatic carbodiimide compound preferably has isocyanate terminal groups from the viewpoint of stability against hydrolysis.

Still further, an aliphatic carbodiimide compound is more preferable than an aromatic carbodiimide compound from the viewpoints of stability against hydrolysis, weatherability and heat resistance.

2. An Antioxidant (B)

An antioxidant (B) used in combination in synthesis of a carbodiimide compound (A) of the present invention is preferably a phosphorus antioxidant it self or said phosphorus antioxidant and a hindered phenol antioxidant in combined use.

In the present invention, it is the biggest feature that an antioxidant (B) is added to a carbodiimide compound (A) during synthesis thereof, that is, an antioxidant (B) is admixed into raw materials of a carbodiimide compound (A) in advance. By this procedure, a carbodiimide compound (A) and an antioxidant (B) can be homogeneously dispersed and present, and a carbodiimide composition of the present invention having yellow index (YI) of not higher than 10, which had not conventionally been achieved, can be obtained. Here, yellow index (YI) in the present invention is measured and evaluated in accordance with JIS K7103, "A Testing Method for Yellow Index and Degree of Yellowing of Plastics".

A phosphorus antioxidant includes such as tris(2,4-di-t-butylphenyl) phosphite (Trade Name: Irgaphos 168 from Ciba Specialty Chemicals Ltd., Trade Name: Adekastab 2112 from Asahi Denka Kogyo K.K., etc.), bis(2,4-di-t- butylphenyl)pentaerythritol diphosphite (Trade Name: Irgaphos 126 from Ciba Specialty Chemicals Ltd., Trade Name: Adekastab PEP-24G from Asahi Denka Kogyo K.K., etc.), bis(2,6-di-t-butyl-4-methylphenyl)pentaerythritol diphosphite (Trade Name: Adekastab PEP-36 from Asahi Denka Kogyo K.K.) and distearyl pentaerythritol diphosphite (Trade Name: Adekastab PEP-8 from Asahi Denka Kogyo K.K., Trade Name: JPP-2000 from Johoku Chemical Co., Ltd., and the like). A phosphorus antioxidant has preferably pentaerythritol structure from the viewpoint of improvement in stability against hydrolysis, and particularly preferably an aromatic hydrocarbon group having a t-butyl group in addition to pentaerythritol structure.

As a particularly preferable example of a phosphorus antioxidant, chemical formula of bis(2,6-di-t-butyl-4-methylphenyl)pentaerythritol diphosphite (Trade Name: Adekastab PEP-36 from Asahi Denka Kogyo K.K.) is shown below.

chemical formula I

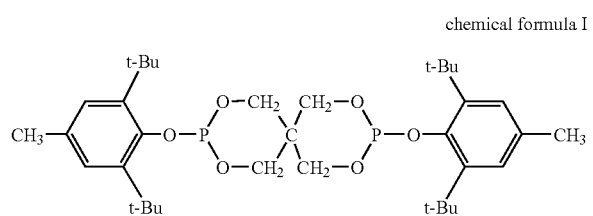

Further, a hindered phenol type antioxidant preferably used in combination with the above-described phosphorus antioxidant has molecular weight of preferably not lower than 400 from the viewpoint of heat resistance requiring a 5% weight loss temperature not lower than 250° C. as determined by a TG method. On the other hand, lower molecular weight may cause phenomena such as scattering, volatilization or extraction by a substance in contact therewith. In particular, since migration of an antioxidant into foods from plastic material in contact with foods may cause a sanitary problem, molecular weight of preferably not lower than 400, more preferably not lower than 500 is used in the present invention. In addition, by selecting a hindered phenol type antioxidant having higher molecular weight, an effect of improving heat resistance of a plastic composition can be provided.

Such a hindered phenol type antioxidant having molecular weight of not lower than 400 includes, for example, 4,4'-methylene-bis-(2,6-di-t-butylphenol) (MW=420), octadecyl-3-(3,5-di-t-butyl-4-hydroxyphenyl)propionate (MW=531) (Trade Name: Irganox 1076 from Ciba Specialty Chemicals Ltd.), pentaerythritoltetrakis[3-(3,5-di-t-butyl-4-hydroxyphenyl)propionate] (MW=1,178) (Trade Name: Irganox 1010 from Ciba Specialty Chemicals Ltd.), 3,9-bis{2-[3-(3-tert-butyl-4-hydroxy-5-methylphenyl)propionyloxy]-1,1-dimethylethyl}-2,4,8,10-tetraoxaspiro[5.5]undecane (MW=741) (Trade Name: Sumilizer GA-80 from Sumitomo Chemical Co., Ltd.).

As described above, an antioxidant used in the present invention is added during synthesis of a carbodiimide compound. By this procedure, coloring of a carbodiimide compound in synthesis thereof can be suppressed, and coloring of a carbodiimide compound, when added to an ester-group-containing resin or a biodegradable plastic, can also be suppressed. An antioxidant can be used in the amount effective to provide improvements in stability against hydrolysis and heat resistance.

Thus, the total amount of an antioxidant (B) to be compounded is preferably 0.01 to 20 parts by weight, and particularly preferably 0.1 to 10 parts by weight to 100 parts by weight of a carbodiimide compound (A). An amount of an antioxidant (B) to be compounded less than 0.01 part by weight gives poor effect in preventing coloring in carbodiimide synthesis or coloring during the addition to an ester-group-containing resin or a biodegradable plastic. On the other hand, an amount over 20 parts by weight causes problems such as lowering the reaction rate in a carbodiimide synthesis or making an antioxidant hardly compatible to the carbodiimide compound.

In the case when a hindered phenol type antioxidant and a phosphorus antioxidant are used in combination as antioxidants, a ratio by weight of a hindered phenol antioxidant to a phosphorus antioxidant is preferably in the range of 5:1 to 1:5.

In addition, an antioxidant to be compounded into plastics may also include antioxidants other than the above-described hindered phenol type antioxidants and phosphite type of antioxidants (phosphorus antioxidants), for example, aromatic amines such as diphenyl amine and phenyl-α-naphthyl amines and sulfur-containing antioxidants. These antioxidants may be used within the amount not to impair the effect of the present invention. For example, a small amount of an aromatic amine type antioxidant can be used in combination, in addition to the above-described hindered phenol or phosphite type antioxidants. However, these aromatic amine type antioxidants or the like must be compounded carefully because it may cause easy coloring.

3. A Carbodiimide Composition

As described above, a carbodiimide composition of the present invention comprises a carbodiimide compound (A) and an antioxidant (B), and preferably has a 5% weight loss temperature not lower than 250° C. of TG as determined by a thermogravimetric (TG) method (a thermobalance analysis method) from the viewpoint of heat resistance, and a yellow index (YI) of not higher than 10 for powder with particle diameter of not larger than 1 mm as determined in accordance with JIS K7103, from the viewpoint of suppression of yellowing.

In the present invention, an antioxidant (B) may preferably be admixed into a carbodiimide compound (A), as described above, during a raw material charging step in synthesis of a carbodiimide compound (A), or may be admixed during a reaction step in said synthesis.

A carbodiimide composition of the present invention can suitably be used as a stabilizer against hydrolysis of a resin having an ester bond (an ester group) or a biodegradable plastic, that is, an easily hydrolysable resin (C).

Amount of a carbodiimide composition to be compounded is preferably 0.01 to 5 parts by weight, and particularly preferably 0.1 to 3.0 parts by weight to 100 parts by weight of an easily hydrolysable resin (C) of an ester-group-containing resin or a biodegradable plastic. An amount less than 0.01 part by weight can not bring about an improvement effect on stability against hydrolysis of an easily hydrolysable resin of an ester-group-containing resin or a biodegradable plastic, whereas an amount over 5 parts by weight may cause strong coloring. In the case when coloring is insignificant, an amount of not lower than 5 parts by weight of a carbodiimide composition may be compounded.

4. An Easily Hydrolysable Resin (C)

4.1 An Ester-group-containing Resin

In the present invention, an ester as a main component or an essential component of a plastic (resin) (that is, preferably a polyhydroxypolyester) involves a reaction product between a polyvalent (preferably a bivalent or a trivalent) alcohol and a polybasic (preferably dibasic) carboxylic acid. In manufacturing of polyesters, instead of using a free polycarboxylic acid, a corresponding polycarboxylic anhydride, a corresponding polycarboxylic acid ester of a lower alcohol or a mixture thereof can also be used. As a polycarboxylic acid, aliphatic, alicyclic, aromatic-aliphatic, aromatic and/or heterocyclic types are included. Substituted acids (for example, with a halogen atom) and/or unsaturated acids can be used, if necessary. Examples of carboxylic acids and derivatives thereof include such as succinic acid, adipic acid, suberic acid, azelaic acid, sebacic acid, dodecanedioic acid, phthalic acid, isophthalic acid, trimellitic acid, phthalic anhydride, tetrahydrophthalic anhydride, hexahydrophthalic anhydride, tetrarchlorophthalic anhydride, endomethylene-tetrahydrophthalic anhydride, glutaric anhydride, maleic acid, maleic anhydride, fumaric acid, dimers and trimers of unsaturated fatty acids (these acids are used by mixing with unsaturated fatty acid monomer such as oleic acid, if necessary); and dimethyl terephthalate ester and bis-glycol terephthalate ester. Polyvalent alcohols include such as ethylene glycol, 1,2- and 1,3-propylene glycol, 1,4-, 1,3- and 2,3-butylene glycol, 1,6-hexanediol, 1,8-octanediol, neopentyl glycol, 1,4-bis(hydroxylmethyl)cyclohexane, 2-methyl-1,3-propanediol, glycerin, trimethylolpropane, 1,2,6-hexanetriol, 1,2,4-butanetriol, trimethylolethane, pentaerythritol, quinitol, mannitol, sorbitol, formitol, methyl glycoside, diethylene glycol, triethylene glycol, tetraethylene glycol, higher polyethylene glycol, dipropylene glycol, higher polypropylene glycol, dibutylene glycol, and higher polybutylene glycol having molecular weight of up to about 10,000. Polyesters may partly have terminal carboxyl groups. Polyesters of lactones such as ϵ-caprolactone and hydroxycarboxylic acids such as ϵ-hydroxycaproic acid may also be used.

"Polyester" involves polyesteramide and polyamide if necessary, for example, mainly linear condensates obtained from a mixture of polybasic saturated or unsaturated carboxylic acids or anhydrides thereof, polyvalent saturated or unsaturated aminoalcohols, diamines, polyamines and mixtures thereof, as well as mixtures of these compounds and the above-described polyvalent alcohols. It should be understood that polyester compounds already having a urethane group or a urea group and natural polyesters optionally modified such as castor oil are also involved in "polyester" in the context of the present invention. Polyesterurethanes stabilized by a stabilizer against hydrolysis of the present invention are known. These types of polyesterurethanes can be synthesized from the above-described polyester having average molecular weight of 500 to about 10,000; other polyols and/or polyamines having relatively high molecular weight such as polyether, polycarbonate, polybutadiene diol or polyol (amine) (these compounds have about 1.5 to 5, preferably about 2 to 3 Zerewitinoff active groups in their molecules in average), if necessary; aromatic, aromatic-aliphatic, aliphatic and/or alicyclic polyisocyanates having about 1.5 to 5 (preferably about 2 to 3, more preferably about 2) isocyanate groups in their molecules in average; and further a chain extension agent for single chains, such as diols, polyols, diamines, polyamines and/or aminoalcohols, if necessary.

The above-described polyhydroxyl compounds may be modified by various methods before using, by a polyisocyanate polyaddition method. For example, according to DE-A-2,210,839 (U.S. Pat. No. 3,849,515) and DE-A-2,544,195, polyols having relatively high molecular weight, composed of various segments bonded by ether crosslink, can be formed by condensation of a mixture of various kinds of polyhydroxyl compounds (for example, one or more kinds of polyesterpolyols) by etherification under the presence of a strong acid. Further, DE-A-2,559,372 discloses introduction of an amide group to a polyhydroxyl compound and or DE-A-2,620,487 discloses introduction of a triazine group to a polyhydroxyl compound by reaction with a polyfunctional cyanate ester.

It is particularly advantageous to convert a polyhydroxyl compound, having relatively high molecular weight, completely or partly to corresponding anthranylate ester by reaction with isatoic anhydride as described in DE-A-2,019,432 and DE-A-2,619,840, as well as U.S. Pat. Nos. 3,808,250, 3,975,428 and 4,016,143. A compound having relatively high molecular weight and a terminal aromatic amino group can thus be obtained. According to DE-A-2,546,536 and U.S. Pat. No. 3,865,791, a compound having relatively high molecular weight and a terminal amino group can be obtained by a reaction of an NCO prepolymer and enamine, aldimine or ketimine containing a hydroxyl group, followed by hydrolysis. Other methods for manufacturing an ester compound having relatively high molecular weight and a terminal amino group or hydrazide group are described in, for example, DE-A-1,694,152 (U.S. Pat. No. 3,625,871).

In the present invention, even a polyhydroxyl compound containing a polyaddition compound, polycondensate or polymer having high molecular weight of a finely dispersed type or a dissolved type can be used. Such a polyhydroxyl compound can be obtained by, for example, an in situ polyaddition reaction (such as a reaction between a polyisocyanate and an amino-functional compound) or an in situ polycondensation reaction (such as a reaction between formaldehyde and phenol and/or amine) in the above-described polyester. These kinds of methods are disclosed in, for example, DE-B-1,168,075 and DE-B-1,260,142, as well as DE-A-2,324,134, DE-A-2,423,984, DE-A-2,512,385, DE-A-2,513,815, DE-A-2,550,796, DE-A-2,550,797, DE-A-2,550,833, DE-A-2,550,862, DE-A-2,633,293 and DE-A-2,639,254. Further, a polyhydroxyl compound can also be obtained by mixing an aqueous polymer dispersion prepared in advance with a polyhydroxyl compound, followed by removing water from the mixture, according to U.S. Pat. No. 3,869,413 or DE-A-2,550,860. The effect of carbodiimide containing isocyanate group, used in the present invention is premised on possibility that a carboxylic acid is formed by thermal degradation or hydrolytic degradation of polyurethane.

Other plastics suitable to be stabilized by the present invention are polyterephthalates, which can be synthesized from, for example, dimethyl terephthalate or other homologous terephthalate esters and butanediol and/or ethanediol. Further, other components such as diols and/or dicarboxylic acids may be incorporated therein. Average molecular weight (Mn) is at least 10,000. Particularly suitable polyterephthalates involve polybutylene terephthalate and polyethylene terephthalate. These substances are used as high quality synthesis materials or fibers. These plastics can also contain a diol with a relatively long chain such as C4 polyether in a relatively high ratio, in elastic form. These materials are available, for example, with a trade name of "Hytrel" (from Du Pont Co.). Other materials suitable to be stabilized by the present invention include a commercially available polyamide with a polyester block, polyetherpolyamide having an ester group, and generally any type of plastic having an ester group, preferably one having an ester group in a main chain thereof.

4.2. A Biodegradable Plastic

A biodegradable plastic used in a thermoplastic resin composition or a biodegradable plastic composition in the present invention, as a main component includes, for example, polyesters metabolized by microorganisms, and among them, preferably aliphatic polyesters which can easily be metabolized by microorganisms.

Generally, in a biodegradable plastic, biodegradation is said to proceed by the following processes.

Namely, in decomposition of a polymer material (a biodegradable plastic) discharged in environment:

(i) Firstly, a polymer decomposition enzyme adsorbs on the surface of a polymer material. The enzyme is one such as extracellularly secreted by a specific kind of microorganism. (ii) Then, the enzyme cleaves chemical bonds such as ester, glycoside and peptide linkages in polymer chains by hydrolysis reaction. (iii) As a result, polymer material is further decomposed up to a monomer unit level by the decomposition enzyme with decrease in molecular weight. (iv) Finally, decomposed products are further metabolized and consumed to be converted to carbon dioxide, water and cell components, etc. by various microorganisms.

Aliphatic polyesters easily metabolized by microorganism via hydrolysis reaction include:
(1) Polylactic acid (polylactide) type aliphatic polyesters
(2) Condensate type aliphatic polyesters from polyvalent alcohols/polybasic acids
(3) Aliphatic polyesters produced by microorganisms such as polyhydroxybutyrate (PHB) and
(4) Polycaprolactone (PCL) type aliphatic polyesters.

In the present invention, any kind of the above-described aliphatic polyesters can be preferably used as a biodegradable plastic.

Further, in the present invention, a biodegradable plastic is not limited to the above-described aliphatic polyesters, and other biodegradable plastics can also be used as long as they have chemical bonds such as ester, glycoside and peptide linkages, where polymer chains in a biodegradable plastic are cleaved by hydrolysis reaction. Such plastics include, for example, a carbonate copolymer of an aliphatic polyester in which carbonate structure is randomly introduced in a molecular chain structure of an aliphatic polyester, and a copolymer of aliphatic polyester and polyamide, having an amide linkage, by introduction of nylon in molecular chain structure of an aliphatic polyester.

Hereinbelow, an aliphatic polyester will be described in more detail.

(1) Polylactic Acid (Polylactide) Type Aliphatic Polyesters

Polylactic acid (polylactide) type aliphatic polyesters include polylactides, more specifically, a polymer of oxyacids such as lactic acid, malic acid and glycolic acid, or a copolymer thereof, for example, polylactic acid, poly(α-malic acid), polyglycolic acid and a glycolic acid/lactic acid copolymer, and particularly an aliphatic polyester of hydroxycarboxylic acid type represented by polylactic acid.

The above-described polylactic acid type aliphatic polyesters can be obtained generally by a so-called lactide method, which is a ring opening polymerization method for lactide as a cyclic diester or corresponding lactones, or by a direct dehydration condensation method for lactic acid and a polycondensation method between formalin and carbon dioxide, as a method other than a lactide method.

Catalysts for manufacturing the above-described polylactic acid type aliphatic polyester include, for example, compounds of tin, antimony, zinc, titanium, iron and aluminum. Among them, preferable catalysts are tin-based and aluminum-based catalysts, and particularly preferable catalysts are tin octylate and aluminum acetylacetonate.

Among the above-described polylactic acid type aliphatic polyesters, poly-L-lactic acid obtained by a ring opening polymerization of lactide is preferable, because it is hydrolyzed to L-lactic acid the safety of which has been confirmed. However, a polylactic acid type aliphatic polyester used in the present invention is not limited to poly-L-lactic acid, and therefore, lactide used for manufacturing thereof is not limited to L-isomer thereof. Even a composition composed of L-isomer, D-isomer and meso-form in an arbitrary ratio can be used, but a ratio of any one isomer unit must be not lower than 90%, when the composition is required to be crystalline and has a high melting point and enhanced mechanical properties and heat resistance.

(2) Condensate Type Aliphatic Polyesters from Polyvalent Alcohols/Polybasic Acids Condensate type aliphatic polyesters from polyvalent alcohols/polybasic acids include, for example, aliphatic glycol/polybasic acid type polyesters obtained by reaction of aliphatic glycols and aliphatic polybasic acids (or anhydrides thereof) under the presence of a catalyst, or aliphatic glycol/polybasic acid type polyesters having high molecular weight, obtained by reaction of the same using a small amount of a coupling agent, if necessary.

Aliphatic glycols for manufacturing aliphatic glycol/polybasic acid type polyesters used in the present invention include, for example, ethylene glycol, 1,4-butanediol, 1,6-hexanediol, decamethylene glycol, neopentyl glycol and 1,4-cyclohexanedimethanol. Ethylene oxide can also be used. Two or more kinds of these glycols may be used in combination.

Aliphatic polybasic acids and anhydrides thereof to form aliphatic glycol/polybasic acid type polyesters by reaction with the above-described aliphatic glycols include, for example, succinic acid, adipic acid, suberic acid, sebacic acid, dodecanoic acid, succinic anhydride and adipic anhydride. Generally, these compounds can be used as any form available on the market. Two or more kinds of these polybasic acids and anhydrides thereof may be used in combination.

The above-described glycols and polybasic acids are aliphatic ones, but a small amount of other types of components, for example, aromatic glycols and aromatic polybasic acids such as trimellitic anhydride and pyromellitic anhydride can be used in combination therewith. However, since introduction of these aromatic components impairs biodegradability, the amount of aromatic glycols and aromatic polybasic acids to be incorporated should be not higher than 20 parts by weight, preferably not higher than 10 parts by weight, and more preferably not higher than 5 parts by weight based on 100 parts by weight of aliphatic glycols.

Further, catalysts for manufacturing the above-described aliphatic glycol/polybasic acid type polyesters include, for example, organic acid salts, alkoxides or oxides of metals such as titanium, tin, antimony, cerium, zinc, cobalt, iron, lead, manganese, aluminum, magnesium and germanium. Among them, tin-based or aluminum-based compounds are preferable.

Manufacturing of the above-described aliphatic glycol/polybasic acid type polyesters can be performed by reacting equivalent amounts of aliphatic glycols and aliphatic polybasic acids together with a catalyst, by heating in a solvent, if necessary, suitably selected for each raw material compound. A prepolymer having a low degree of polymerization can be manufactured by suppressing progress of the reaction.

In manufacturing the above-described aliphatic glycol/polybasic acid type polyesters, a coupling agent can be used for a prepolymer having a particularly low degree of polymerization to further increase number average molecular weight. This coupling agent includes, for example, diisocyanates, oxazoline, diepoxy compounds and acid anhydrides, and use of diisocyanates is particularly preferable.

Diisocyanates as the above-described coupling agent is not specifically limited in type thereof, and include, for example, 2,4-tolylene diisocyanate, a mixture of 2,4-tolylene diisocyanate and 2,6-tolylene diisocyanate, diphenylmethane diisocyanate, 1,5-naphthalene diisocyanate, xylylene diidocyanate, hydrogenated xylylene diidocyanate, hexamethylene diisocyanate, isophorone diisocyanate and 4,4'-dicyclohexylmethane diisocyanate. Among them, hexamethylene diisocyanate is particularly preferable from the viewpoints of hue of aliphatic glycol/polybasic acid type polyesters obtained and reactivity when compounded into the above-described prepolymer.

Amount of the above-described coupling agent to be used is 0.1 to 5 parts by weight, preferably 0.5 to 3 parts by weight to 100 parts by weight of the above-described prepolymer. An amount less than 0.1 parts by weight can not provide sufficient coupling reaction, and an amount over 5 parts by weight may cause gelation.

Further, the above-described aliphatic glycol/polybasic acid type polyesters may be capped or modified at a terminal hydroxyl group thereof with other compounds via double bond, urethane linkage and urea linkage, or by other methods.

Aliphatic polyesters, which are condensed products of polyvalent alcohols and polybasic acids, practically available on the market include, for example, polybutylene succinate (PBS) and polyethylene succinate (PES).

Polybutylene succinate (PBS) type aliphatic polyesters include, for example, polybutylene succinate (PBS) consisting of butanediol and succinic acid, or adipate copolymer (PBSA) in which adipic acid is copolymerized therein, and further an adipate/terephthalate copolymer in which terephthalic acid is copolymerized therein, to facilitate biodegradability. Commercially available products include, for example, "Bionolle" (trade name) from Showa Highpolymer Co., Ltd., "EnPol" (trade name) from Elle Chemical Ltd., "Ecoflex" (trade name) from BASF A.G. and "Biomax" (trade name) from Du Pont Co.

Further, polyethylene succinate (PES) has also been available on the market, and commercial products thereof include, for example, "Runare SE" (trade name) from Nippon Shokubai Co., Ltd.

(3) Aliphatic Polyesters Produced by Microorganisms

Certain kinds of microorganisms accumulate polyester materials in their cells. Polyester materials produced by microorganisms are thermoplastic polymers having organism-derived melting point. And such polymers are decomposed by an enzyme, extracellularly secreted from the microorganisms in nature, and the decomposed products are consumed by microorganisms until complete extinction.

Such (aliphatic) polyesters produced by microorganisms include polyhydroxybutyrate (PHB), and copolymers such as poly(hydroxyvaleric acid-hydroxylpropionic acid) and poly(hydroxylbutyric acid-hydroxylpropionic acid).

(4) Polycaprolactone Type Aliphatic Polyesters

Polycaprolactone, which is a kind of an aliphatic polyester, can be obtained by ring opening polymerization of ε-caprolactone, and decomposed by various bacteria in spite of a water-insoluble polymer.

Polycaprolactone is an aliphatic polyester represented by the general formula: $-(O(CH_2)_5CO)_n-$, and a commercial product of such a polycaprolactone type aliphatic polyester includes, for example, "Tone" (trade name) from Nippon Unicar Co., Ltd.

A carbodiimide composition of the present invention is used in an effective amount to obtain improvements in stability against hydrolysis and resistance to yellowing of an ester-group-containing resin or a biodegradable plastic, that is an easily hydrolysable resin (C).

A carbodiimide compound (A) shows yellowing progressed by heat, thermal oxidation and the like, not only in a synthesis step thereof but also in a compounding step into an ester-group-containing resin or a biodegradable plastic.

Further, since yellowing of a carbodiimide compound is caused by heat, $NO_x$, sunlight, etc. molded resin parts themselves exhibit yellowing even after molding. Yellowing becomes more significant with increase in the amount of a carbodiimide compound to be compounded into a resin.

Thus, the amount of a carbodiimide composition of the present invention, to be compounded, is preferably 0.01 to 5 parts by weight, and particularly preferably 0.1 to 3 parts by weight to 100 parts by weight of an easily hydrolysable resin, as described above.

In the present invention, mixing of the above-described carbodiimide composition into an ester-group-containing resin or a biodegradable plastic, that is, an easily hydrolysable resin (C), can be performed by dissolving a carbodiimide composition in an organic solvent, followed by removing said organic solvent. In this case, said organic solvent to be used is desirably capable of dissolving a biodegradable plastic, and furthermore not polymerizable and has no active hydrogen. Typically, said solvents include, for example, chloroform and tetrahydrofuran (THF).

Further, a mixing method for the above-described carbodiimide composition into an ester-group-containing resin or a biodegradable plastic includes melt kneading using an extruder or a method to add a carbodiimide composition after synthesis of an ester-group-containing resin or a biodegradable plastic.

In the case of said melt kneading method using an extruder, any of the following method may be used.

(i) A carbodiimide compound and an ester-group-containing resin or a biodegradable plastic are mixed simultaneously.

(ii) An ester-group-containing resin or a biodegradable plastic is dissolved first, then a carbodiimide composition is mixed using a side feeder or a liquid addition equipment.

5. Other Additives

An ester-group-containing resin or a biodegradable plastic composition of the present invention, that is, a thermoplastic composition, may contain, in addition to a carbodiimide composition of the present invention, reinforcing materials other than the above-described carbodiimide composition, clay, phyllosilicate salt, talc, mica, inorganic or organic fillers, antioxidants of amine type, phenol type or phosphorus type, thermal stabilizers, hindered amine type light stabilizers, UV absorbing agents, as well as flame retardants, lubricants, waxes, pigments, dyes, colorants, crystallization accelerators, titanium oxide, organic degradable materials such as starch or the like in combination, within a range not to impair the effects of the present invention, if necessary.

EXAMPLES AND COMPARATIVE EXAMPLES

Hereinbelow, the present invention will be described in more detail. Here, physical properties in Examples were measured and evaluated by the following methods.

[Yellow Index (YI)]

Yellow Index ($YI_0$) was measured under the conditions in accordance with JIS K7103. As a color difference calorimeter, NF 333 from Nippon Denshoku Kogyo Co., Ltd. was used.

[Thermal Discoloration]

YI was measured after standing in a dryer at 120° C. for 75 hours, and thermal discoloration was calculated by the following equation (1):

$$\Delta YI=YI-YI_0 \qquad \text{Equation (1):}$$

[Sunlight Discoloration]

Using test sample pieces, YI was measured after irradiation by a xenon lamp for 500 hours under the conditions of BPT at 60° C.×50% R.H., and sunlight discoloration was calculated by the following equation (2):

$$\Delta YI=YI-YI_0 \qquad \text{Equation (2):}$$

[Stability Against Hydrolysis]

Using test sample pieces, tensile strength was measured after standing in a thermo-hygrostat at 80° C., 90% R.H. for a specified period (100 hours), and stability against hydrolysis was calculated as a percentage (%) to tensile strength before standing. Higher tensile strength retention means higher stability against hydrolysis.

[Heat Resistance] [5% Weight Loss Temperature TG 5% (° C.)]

Heat resistance was measured on about 10 mg of sample using a TG/DTA instrument, model TG/DTA 6200 from Seiko Instruments Inc., under nitrogen atmosphere at a temperature increasing rate of 10° C./min. Heat resistance was measured as "temperature" at which sample weight loss is 5% based on the initial weight.

Before carrying out Examples and Comparative Examples, carbodiimide compounds and carbodiimide compositions were synthesized in advance.

Synthesis Example 1

Synthesis of a Carbodiimide Compound

Into a flask equipped with a stirring motor, a nitrogen gas bubbling tube and a condenser, 100 parts by weight of 4,4'-dicyclohexylmethane diisocyanate and 0.5 part by weight of 3-methyl-1-phenyl-2-phosphorene-1-oxide were charged. The mixture was subjected to a carbodiimidation reaction at 185° C. for 24 hours, with nitrogen gas bubbling. NCO % of carbodiimide obtained was 2.4%.

Synthesis Example 2

Synthesis of a Carbodiimide Compound

Into a flask equipped with a stirring motor, a nitrogen gas bubbling tube and a condenser, 100 parts by weight of 4,4'-dicyclohexylmethane diisocyanate, 0.5 parts by weight of 3-methyl-1-phenyl-2-phosphorene-1-oxide and 1 part by weight of bis(2,4-di-tert-butylphenyl)pentaerythritol diphosphite were charged. The mixture was subjected to a carbodiimidation reaction at 185° C. for 24 hours with nitrogen gas bubbling. NCO % of carbodiimide obtained was 2.4%.

Synthesis Example 3

Synthesis of a Carbodiimide Composition

Into a flask equipped with a stirring motor, a nitrogen gas bubbling tube and a condenser, 100 parts by weight of 4,4'-dicyclohexylmethane diisocyanate, 0.5 part by weight of 3-methyl-1-phenyl-2-phosphorene-1-oxide, 1 part by weight of bis(2,4-di-tert-butylphenyl)pentaerythritol diphosphite and 1 part by weight of pentaerythritoltetrakis [3-(3,5-di-t-butyl-4-hydroxyphenyl) propionate] were charged. The mixture was subjected to a carbodiimidation reaction at 185° C. for 24 hours with nitrogen gas bubbling. NCO % of carbodiimide obtained was 2.4%.

Synthesis Example 4

Synthesis of a Carbodiimide Compound

Into a flask, 614 g of 4,4'-dicyclohexylmethane diisocyanate and 20 g of cyclohexylamine were charged. The mixture was stirred at 100° C. for 1 hour, then added with 2.9 g of a carbodiimidation catalyst (3-methyl-1-phenyl-2-phosphorene-1-oxide), followed by reacting at 185° C. for 30 hours to obtain 4,4'-dicyclohexylmethanecarbodiimide (degree of polymerization=10) having a urea terminal linkage.

Comparative Example 1

An aliphatic polyester resin, containing polybutylene succinate/adipate as a main component, was used as a biodegradable plastic. A mixture of 100 parts by weight of said biodegradable plastic (an aliphatic polyester), 0.5 part by weight of the carbodiimide compound synthesized in Synthesis Example 1, 0.05 part by weight of (2,4-di-tert-butylphenyl)pentaerythritol diphosphite (Trade Name: Irgaphos 126) as a phosphorus antioxidant was dry blended, then kneaded by a twin-screw extruder, and a film with a thickness of 200 μm was prepared through a T-die. Dumb-bells according to JIS No. 4 were punched from this film as test pieces, and used for evaluation of physical properties. The composition and the evaluation results are shown in Table 1.

Examples 1 to 4

In Examples 1 and 2, an aliphatic polyester resin mainly containing polybutylene succinate/adipate was used as a biodegradable plastic. A mixture of 100 parts by weight of the biodegradable plastic (aliphatic polyester) and 0.5 part by weight and 1.0 part by weight of the carbodiimide composition synthesized in Synthesis Example 2, in Example 1 and 2, respectively, was dry blended, then kneaded by a twin-screw extruder, and films with a thickness of 200 μm were prepared through a T-die. Dumb-bells according to JIS No. 4 were punched from these films as test pieces, and used for evaluation of physical properties. The compositions and the evaluation results are shown in Table 1.

In Example 3, the same procedure was repeated as in Example 1 except that the carbodiimide composition was altered to the one synthesized in Synthesis Example 3 to prepare a film, which was used for evaluation of physical properties. The composition and the evaluation results are shown in Table 1.

In Example 4, the same procedure was repeated as in Example 2 except that a biodegradable plastic was altered to an aliphatic polyester resin containing polylactic acid as a main component to prepare a film, which was used for evaluation of physical properties. The composition and the evaluation results are shown in Table 1.

Comparative Examples 2 to 5

In Comparative Example 2, the same procedure was repeated as in Comparative Example 1 except that the carbodiimide compound was altered to the one synthesized in Synthesis Example 4 to prepare a film, which was used for evaluation of physical properties. The composition and the evaluation results are shown in Table 1.

In Comparative Example 3, the same procedure was repeated as in Comparative Example 1 except that the carbodiimide compound was commercially available "Stabakzol P" (made by Bayer A.G.) to prepare a film, which was used for evaluation of physical properties. The composition and the evaluation results are shown in Table 1.

In Comparative Example 4, the same procedure was repeated as in Example 2 except that 1.0 part by weight of the carbodiimide compound synthesized in Synthesis Example 1 and 0.01 part by weight of phosphorus antioxidant, which corresponded to the amount in Example 2, were dry blended, to prepare a film, which was used for evaluation of physical properties. The composition and the evaluation results are shown in Table 1.

In Comparative Example 5, the same procedure was repeated as in Example 2 except that the biodegradable plastic was altered to an aliphatic polyester resin mainly containing polylactic acid and also the carbodiimide compound was altered to one synthesized in Synthesis Example 1, to obtain a film, which was used for evaluation of physical properties. The composition and the evaluation results are shown in Table 1.

TABLE 1

| | Comparative Example 1 | Example 1 | Example 2 | Example 3 | Example 4 | Comparative Example 2 | Comparative Example 3 | Comparative Example 4 | Comparative Example 5 |
|---|---|---|---|---|---|---|---|---|---|
| 1. Composition (parts by weight) | | | | | | | | | |
| (1) Biodegradable plastic (Aliphatic polyester) | | | | | | | | | |
| Polybutylene succinate/adipate | 100 | 100 | 100 | 100 | — | 100 | 100 | 100 | — |
| Polylactic acid | — | — | — | — | 100 | — | — | — | 100 |
| (2) Carbodiimide composition (compound) | | | | | | | | | |
| Synthesis Example 1 Carbodiimide composition | 0.5 | — | — | — | — | — | — | 1.0 | 1.0 |
| Synthesis Example 2 Carbodiimide composition (+Phosphorus) | — | 0.5 | 1.0 | — | 1.0 | — | — | — | — |
| Synthesis Example 3 Carbodiimide composition (+Phosphorus + Phenol type) | — | — | — | 0.5 | — | — | — | — | — |
| Synthesis Example 4 Carbodiimide compound) | — | — | — | — | — | 0.5 | — | — | — |
| Stabakzol P | — | — | — | — | — | — | 0.5 | — | — |
| (3) Antioxidant | | | | | | | | | |
| Phosphorus (phosphite) type Bis(2,4-di-tert-butylphenyl) pentaerythritol diphosphite | 0.05 | — | — | — | — | 0.05 | 0.05 | 0.01 | — |
| Phenol type Pentaerythritoltetrakis [3-(3,5-di-t-butyl-4-hydroxyphenyl) propionate] | — | — | — | — | — | — | — | — | — |
| 2. Evaluation results | | | | | | | | | |
| Heat resistance of a carbodiimide composition (compound), TG 5% weight reduction (° C.) | 361 | 363 | 363 | 358 | 363 | 305 | 307 | 361 | 361 |
| Yellow Index of a carbodiimide composition (compound) (YI) | 10.2 | 6.4 | 6.4 | 5.7 | 6.4 | 13.7 | 30.7 | 10.2 | 10.2 |
| Stability against hydrolysis, Retention of strength (%) | 85.7 | 90 | 100 | 92 | 94 | 72 | 64.5 | 89 | 78 |
| $YI_0$ | 6 | 5.6 | 5.3 | 5.3 | 4.9 | 7.6 | 9.5 | 5.7 | 5.8 |
| Thermal discoloration Coloring after 75 hours ($\Delta YI$) | 1.8 | 0.6 | 0.9 | 0.5 | 0.3 | 2.9 | 2.7 | 2 | 3.1 |
| Sunlight discoloration Coloring after 500 hours ($\Delta YI$) | 2.2 | 0.8 | 1.1 | 1.1 | 0.7 | 3.1 | 17 | 2.5 | 3.2 |

As obvious from the results of Examples and Comparative Examples shown in Table 1, in Examples 1 to 4, in each of which a carbodiimide composition to be added with an antioxidant during synthesis thereof were compounded into a biodegradable plastic, stability against hydrolysis, that is, resistance to biodegradation via hydrolysis, and discoloration were found to be remarkably improved compared with a composition in Comparative Example 1 where a larger amount of antioxidant was compounded or a composition in Comparative Example 5 where approximately the same amount of antioxidant was compounded.

INDUSTRIAL APPLICABILITY

A thermoplastic resin composition or a biodegradable plastic composition, wherein a carbodiimide compound of the present invention is compounded in an ester-group-containing resin or a biodegradable plastic as a stabilizer against hydrolysis, is superior in stability against hydrolysis and has an enhanced effect to prevent yellowing, therefore, said composition can be applied to agricultural, forestal and fisheries materials (mulch film, mulch sheet, planting pot, fishing line, fishing net, and the like), civil engineering materials (water holding sheet, plant net, sandbag, and the like), molded parts, extruded parts, thermoformed parts, foamed body, blow molded parts, fibers, nonwoven fabrics and films for packaging/containers, and is particularly suitably to films, sheets, fibers for clothing, bottles and trays where hue is seriously considered.

The invention claimed is:

1. A stabilizer against hydrolysis for an ester-group-containing resin or a biodegradable plastic, mainly comprising a carbodiimide composition comprising a carbodiimide compound (A) and an antioxidant (B) having 5% weight loss at a temperature not lower than 250° C. as determined by a thermogravimetric (TG) method,
wherein the antioxidant (B) is dispersed and present in the composition by admixing during synthesis of the carbodiimide compound (A).

2. A thermoplastic resin composition having superior stability against hydrolysis, wherein the stabilizer against hydrolysis according to claim 1 is compounded in at least one kind of an easily hydrolysable resin (C) selected from an ester-group-containing resin or a biodegradable plastic.

3. The thermoplastic resin composition according to claim 2, wherein the easily hydrolysable resin (C) is an aliphatic polyester.

4. The stabilizer according to claim 1, wherein the antioxidant (B) is dispersed and present in the composition by admixing in raw materials of the carbodiimide compound (A) beforehand.

5. The stabilizer according to claim 1, wherein a ratio of the carbodiimide compound (A) to the antioxidant (B) is 0.01 to 20 parts by weight of(B) to 100 parts by weight of (A).

6. The stabilizer according to claim 1, wherein the carbodiimide compound (A) is an aliphatic polycarbodiimide compound having degree of polymerization not lower than 5.

7. The stabilizer according to claim 1, wherein the antioxidant (B) is any one of a phosphorus antioxidant as it is or a mixture of a phosphorus antioxidant and a hindered phenol antioxidant.

8. The stabilizer according to claim 7, wherein the phosphorus antioxidant has a pentaerythritol structure.

9. The stabilizer according to claim 1, wherein the carbodiimide composition has a yellow index (YI) not higher than 10.

10. The stabilizer according to claim 1, which is capable of stabilizing an aliphatic polyester.

* * * * *